3,341,610
HYDROGENATION OF ALPHA,BETA-UNSATURATED ALDEHYDES

Andrew P. Dunlop, Riverside, Donald G. Manly, Barrington, and Fred J. Rice, Jr., Carpentersville, Ill., assignors to The Quaker Oats Company, Chicago, Ill., a corporation of New Jersey
No Drawing. Filed Mar. 24, 1965, Ser. No. 442,528
6 Claims. (Cl. 260—638)

This invention relates to an improved process for hydrogenation of alpha,beta-unsaturated aldehydes to their corresponding saturated alcohols. More specifically, it relates to a process in which alpha,beta-unsaturated aldehydes in the vapor phase and gaseous hydrogen come in contact with a catalyst to produce the corresponding saturated alcohols. This application is a continuation-in-part of our prior co-pending application Ser. No. 104,849, filed Apr. 24, 1961, now abandoned.

Among the saturated alcohols which can be produced by this invention are butanol, pentanol, 2-methyl butanol, hexanol, 2-ethylbutanol, 2-methylpentanol, 2-ethylpentanol, 3-methylhexanol, and 2-ethylhexanol. Of particular commercial importance are butanol and ethylhexanol; one use of which is in the manufacture of plasticizers.

One of the objects of this invention is to produce saturated alcohols in high yields.

An additional object of this invention is to provide a process for producing saturated alcohols that employs relatively inexpensive materials and equipment.

A further object of the invention is to provide a process for making saturated alcohols which makes possible the use of the same catalyst over a long period without regeneration.

A still further object of this invention is to provide a process for making saturated alcohols in wich it is not necessary to recycle the product in order to obtain substantially quantitative conversions and yields.

Further and additional objects will appear from the following description and accompanying claims.

In accordance with the invention, the broad objects are accomplished by contacting an alpha,beta-unsaturated aldehyde in the vapor phase with hydrogen at an elevated temperature in the presence of a copper chromite catalyst. In converting the unsaturated aldehyde to the saturated alcohol, the temperature employed is above 90° C. and below 220° C. and preferably between about 120° C. and about 215° C. Hydrogen is supplied to the reaction zone in a stoichiometric excess, preferably in such a quantity that the molar ratio of hydrogen to the aldehyde is between about 3:1 and about 70:1, and most preferably between about 6:1 and about 25:1. The reactants are passed to the catalytic reaction zone in the vapor phase, and the reaction is carried out at low pressures which may range from subatmospheric up to about five atmospheres. Preferably the pressure is between about 1 and about 3 atmospheres.

While it is characteristic of the process of this invention that substantially quantitative conversions can be obtained at relatively low average hydrogenating temperatures, e.g., about 90° to 140° C., in practice the exothermic nature of the reaction usually results in the formation of a hot zone in the catalyst bed at and/or adjacent the reaction front, the temperature of which may be substantially above the minimum and preferred temperature for obtaining substantially 100% conversion. The maximum temperature of such hot zones must be controlled so as not to attain the temperature (220° C.) at which undesired side reactions begin to occur to an extensive degree.

In a preferred embodiment of the invention the temperature of the hot zone is controlled by the provision of a heat-exchange surface located no more than 1.5 inches from any point in the hot zone. Such heat-exchange surface may be provided, for example, by conducting the reaction in a jacketed reactor tube, the jacket of which contains a circulating heat-exchange medium such as an oil. With the aforedescribed provision, substantially quantitative conversions are obtained in a single pass over the catalyst.

Suitable alpha,beta-unsaturated aldehydes for the feed material are aldehydes having the generic formula RCH=CR'—CHO; where R is a methyl, ethyl, or n-propyl radical and R' is a hydrogen atom, or a methyl or ethyl radical. Also suitable are any alpha,beta-unsaturated aldehydes having 4 to 8 carbon atoms. Such aldehydes include butenal, pentenal, 2-methyl butenal, hexenal, 2-ethylbutenal, 2-methylpentenal, 2-ethylpentenal, 2-methylhexenal, and 2-ethylhexenal.

In one embodiment of this invention an aqueous solution of aldehyde is employed in wihch water is 10% to 50% by weight of the total solution. This water content is higher than some commercial grades of crude crotonaldehyde which run about 9% water. This higher water content appears to prevent any permanent catlyst deactivation at high feed rates.

The catalyst employed in the process of this invention is reduced copper oxide-chromium oxide (also frequently referred to as copper chromite), in which the ratio by weight of copper oxide (CuO) to chromium oxide ($Cr_2O_3$) prior to reduction is less than 10:1 and more than 1:1 but preferably less than 5:1 and more than 1.25:1. These catalysts are well known to the art and are described by Homer Adkins in the book, "Reactions of Hydrogen with Organic Compounds Over Chromium Oxide and Nickel Catalysts," University of Wisconsin Press, 1944, pages 12–14. The catalyst may be in the form of pellets or pellet particles. It is preferable that the catalyst be reduced with hydrogen at a temperature below about 350° C. prior to use in the process of this invention.

A preferred procedure for the prior reduction of the catalyst is as follows: Copper chromite, preferably having a copper-to-chromium ratio within the aforedescribed limits, is heated to about 140° C. under a nitrogen or other inert atmosphere. Hydrogen is slowly added to the system at such a rate as to avoid the build-up of temperatures above 250° C. within the catalyst bed. The gas flowing over the catalyst bed is gradually enriched with hydrogen as the temperature is slowly raised to 200° C. At this temperature the gas should be pure hydrogen. It is held at this temperature until no further formation of water of reduction is observed. The catalyst is then ready for use in the process of this invention.

The invention will be further illustrated but is not limited by the following examples in which the quantities of reactants are in parts by weight unless otherwise indicated. The term "space velocity" is calculated and is expressed in terms of volumes of gas at standard conditions per bulk volume of catalyst per hour. Feed rate, where given in the examples, is in parts of the aldehyde per hour per part of catalyst based on the weight of unreduced catalyst as charged to the reactor. Two types of temperature data are reported in the examples: (1) the temperature of the circulating oil in a jacket surrounding the catalyst chamber, and (2) the highest temperature of the catalyst bed, referred to as the hot zone temperature.

The hot zone temperatures shown in the examples that follow were obtained by means of a roving thermocouple in the center of an elongated cylindrical catalyst bed of a pilot plant reactor having an internal diameter of about 1.4 inches. The temperatures stated are based on observations of the highest temperatures encountered as the thermocouple is moved through the catalyst bed. While the temperatures are the highest temperatures read, it should be understood that they are not necessarily the highest temperatures at the individual catalytic sites of each catalyst pellet. Limitations of standard pilot plant temperature-measuring equipment prevent further definitive information in this regard. The integrated average temperature of the entire catalyst bed is, of course, substantially less than the maximum permissible hot zone temperature.

The results in the examples below are reported in terms of the conversion of the aldehyde, the yield of the alcohol (percent of theoretical) and the percent of total aldehydes. Percent conversion is here defined as the difference between the weight of the aldehyde fed and the weight of the aldehyde in the product divided by the weight of the aldehyde fed times 100.

Yield (%) is defined by the following:

$$\frac{\text{Weight of alcohol in product} \times 100}{\text{Weight of aldehyde fed} \times \frac{\text{molecular weight of alcohol}}{\text{molecular weight of aldehyde}}}$$

The percent of total aldehydes was determined by a colorimetric comparison of a "Fuchsin Aldehyde Test" on the crude reaction product prior to distillation with known standards prepared by using butyraldehyde. For a commercial grade of alcohol it is important to have no substantial amount of aldehyde impurities.

Example 1

Copper chromite pellets having the designation "Cu-0203-T1/8" (bulk density 2,160 grams per liter) obtained from Harshaw Chemical Company and having a composition of about 80% CuO and about 20% $Cr_2O_3$ were reduced according to the following procedure: About 3500 parts of the pellets were charged to a packeted, steel reactor tube included in a hermetically-joined system comprising a recycle compressor, flowmeter, preheater, reactor tube, condenser and product tank. The entire system was thoroughly flushed with nitrogen to purge it of any oxygen. The system was then pressurized with nitrogen and valves adjusted to obtain a flow of about 1500 parts of the gas per minute with compressor intake discharge pressure of about 4 and 8 pounds per square inch, respectively. The preheater was adjusted to obtain a gas temperature of about 170° C. in the catalyst charge (catalyst bed). Hydrogen was then fed into the circulating nitrogen stream at a rate of about 50 parts per minute. After about 428 parts of water had condensed and collected in the product tank, the system was thoroughly flushed with hydrogen to purge the system of nitrogen. The temperature of the hydrogen gas flowing through the catalyst bed was then gradually raised to about 225° C. over a period of about one hour and held at that temperature for an additional hour. An additional 2.3 parts of water were condensed and collected.

After reduction of the catalyst as described above, crude crotonaldehyde (90.7% crotonaldehyde and 9.0% water) along with hydrogen gas was fed to a vaporizer. The molar ratio of hydrogen to crotonaldehyde was maintained at 15:1. The gases produced by this vaporization were then passed through the above-mentioned reduced catalyst bed. The temperature of the reaction column as indicated by the circulating oil temperature was 118° C. The temperature of the hot zone in the catalyst bed was maintained below 220° C. The feed rate was 0.16. The resulting product vapors were condensed to give a mixed condensate comprising butanol, water, and crotonaldehyde. The condensate obtained was fractionally distilled. The conversion of crotonaldehyde was 99.9%, and the yield of butanol was 97% of theoretical. Total aldehydes were less than 0.4%. The butanol was withdrawn as the product.

After the catalyst had been used under the above conditions for a period of 550 hours, substantially the same conversions and yields were obtained, and at the end of this period there was no indication of any catalyst inactivation.

Example 2

The procedure of Example 1 was repeated, with the following exceptions: (1) the feed rate was 0.21, (2) the temperature of the circulating oil was maintained at 135° C., (3) the temperature of the hot zone in the catalyst bed was maintained below 212° C., and (4) the molar ratio of hydrogen to crotonaldehyde was 10:1. Space velocity, therefore, was 1,590 hr.$^{-1}$ The conversion of crotonaldehyde was 98%, and the yield of butanol was 92% of theoretical.

Example 3

The procedure of Example 1 was repeated with the following exceptions: (1) the temperature of the circulating oil was maintained at 104° C., (2) the feed rate was 0.12, and (3) the molar ratio of hydrogen to crotonaldehyde was 20:1. The conversion of crotonaldehyde was 99.5%, and the yield of butanol was 95% of theoretical. Total aldehydes were 0.5%.

Example 4

The procedure of Example 1 was repeated with the following exceptions: (1) the temperature of the circulating oil was maintained at 90° C., (2) the feed rate was 0.026, and (3) the molar ratio of hydrogen to crotonaldehyde was 36:1. Space velocity, therefore, was 670 hr.$^{-1}$ The conversion of crotonaldehyde was greater than 99.9%, and the yield of butanol was 96.5% of theoretical. Total aldehydes were less than 0.4%.

Example 5

The procedure of Example 1 was repeated with the following exceptions: (1) refined crotonaldehyde (99.8% crotonaldehyde) was used as the feed material, (2) the temperature of the circulating oil was maintained at 102° C., (3) the temperature of the hot zone in the catalyst bed was maintained below 109° C., and (4) the feed rate was 0.027. The conversion of crotonaldehyde was 99.9%, and the yield of butanol was 99.6% of theoretical. Total aldehydes were less than 0.4%.

Example 6

The procedure of Example 1 was repeated with the following exceptions: (1) refined crotonaldehyde (99.8%) was employed as the feed material, (2) the temperature of the circulating oil was maintained at 103° C., (3) the temperature of the hot zone in the catalyst bed was maintained below 117° C., (4) the feed rate was 0.054, and (5) the molar ratio of hydrogen to crotonaldehyde was 5:1. The conversion of crotonaldehyde was 99.9% and the yield of butanol was 99.6% of theoretical. Total aldehydes were less than 0.4%.

Example 7

The procedure of Example 1 was repeated with the following exceptions: (1) refined crotonaldehyde was employed as the feed material, (2) the temperature of the circulating oil was maintained at 129° C., (3) the temperature of the hot zone in the catalyst bed was maintained below 139° C., (4) the feed rate was 0.027, and (5) the molar ratio of hydrogen to crotonaldehyde was 31:1. The conversion of crotonaldehyde was 99.9%, and the yield of butanol was 99.9% of theoretical.

Example 8

The procedure of Example 1 was repeated with the following exceptions: (1) refined crotonaldehyde was employed as the feed material, (2) the temperature of the circulating oil was 198° C., (3) the temperature of the hot zone in the catalyst bed was maintained below 204° C., (4) the feed rate was 0.027, and (5) the molar ratio of hydrogen to crotonaldehyde was 31:1. The conversion of crotonaldehyde was 100%, and the yield of butanol was 98.1% of theoretical. Total aldehydes were less than 0.4%.

Example 9

The procedure of Example 1 was repeated with the following exceptions: (1) 2-ethylhexenal was employed as the feed material, (2) the temperature of the circulating oil was 195° C., (3) the temperature of the hot zone in the catalyst bed was maintained below 200° C., (4) the feed rate was 0.036, and (5) the molar ratio of hydrogen to 2-ethylhexenal was 30:1. The resulting product vapors were condensed to give substantially pure 2-ethylhexanol. The conversion of ethylhexenal was 100%, and the yield of ethylhexanol was 98% of theoretical.

Example 10

The procedure of Example 9 was repeated with the following exceptions: (1) the temperature of the circulating oil was maintained at 212° C., and (2) the temperature of the hot zone was maintained below 215° C. The conversion of ethylhexenal was 100%, and the yield of ethylhexanol was 95% of theoretical.

Example 11

The procedure of Example 1 was repeated with the following exceptions: (1) the aldehyde feed material contained 72.4% crotonaldehyde and 27.2% water, (2) the temperature of the circulating oil was 145° C., (3) the temperature of the hot zone in the catalyst bed was maintained below 171° C., and (4) the feed rate was 0.134. The conversion of crotonaldehyde was 98.9%, and the yield of butanol was 99.5% of theoretical. Total aldehydes were less than 0.5%.

Example 12

The procedure of Example 9 was repeated with the following exceptions: (1) the aldehyde feed material contained 80.0% 2-ethylhexenal and 20.0% water, (2) the temperature of the circulating oil was 120° C., and (3) the temperature of the hot zone in the catalyst bed was maintained below 123° C. The conversion of ethylhexenal was 100% and the yield of ethylhexanol was 99.8% of theoretical.

From the examples it is apparent that the invention advances the art of producing saturated alcohols to a considerable degree. The catalyst may be employed over an unusually long period of time without regeneration or replacement; the yield of the saturated alcohol is substantially quantitative; substantially quantitative conversions can be obtained without revaporizing and recycling the product; and of further importance, the reaction takes place at substantially atmospheric pressure so that expensive high-pressure equipment need not be employed.

We claim:

1. A low-pressure, single pass process of producing a saturated alcohol comprising contacting an aldehyde with a stoichiometric excess of hydrogen, said aldehyde having the general formula $$RCH=CR'-CHO$$

wherein R is a member selected from the group consisting of methyl, ethyl, and n-propyl, and R' is a member selected from the group consisting of hydrogen, methyl, and ethyl, said contacting being in the vapor phase at a pressure from subatmospheric to five atmospheres and at a temperature above 90° C. and below 220° C. in the presence of a reduced copper oxide (CuO)-chromium oxide ($Cr_2O_3$) catalyst having a ratio by weight of copper oxide (CuO) to chromium oxide ($Cr_2O_3$) of less than 10:1 and more than 1:1 prior to reduction.

2. A process according to claim 1 wherein the catalyst is copper oxide-chromium oxide reduced with hydrogen at a temperature below 350° C.

3. A process according to claim 1 wherein the molar ratio of hydrogen to the aldehyde is between 3:1 and 70:1.

4. A single pass process for producing a saturated alcohol comprising contacting an aldehyde in the vapor phase with hydrogen in the presence of a reduced copper oxide (CuO)-chromium oxide ($Cr_2O_3$) catalyst having a ratio by weight of copper oxide (CuO) to chromium oxide ($Cr_2O_3$) of less than 5:1 and more than 1.25:1 prior to reduction, the molar ratio of hydrogen to aldehyde being between 6:1 and 125:1, said aldehyde having the general formula $$RCH=CR'-CHO$$

wherein R is a member selected from the group consisting of methyl, ethyl, and n-propyl, and R' is a member selected from the group consisting of hydrogen, methyl, and ethyl, said contacting being at a temperature between 125° C. and 215° C. and at a pressure between 1 and 3 atmospheres.

5. A process according to claim 4 wherein the aldehyde is crotonaldehyde and is present in an aqueous solution in which water is 10% to 50% by weight of the total solution.

6. A process according to claim 4 wherein the aldehyde is 2-ethylhexenal and is present in an aqueous solution in which water is 10% to 50% by weight of the total solution.

References Cited

UNITED STATES PATENTS 2,060,267 11/1936 Toussaint _____ 260—638
2,825,743 3/1958 McLean et al. _____ 260—638

FOREIGN PATENTS 316,399 8/1929 Great Britain.

LEON ZITVER, *Primary Examiner.*

J. E. EVANS, *Assistant Examiner.*